May 20, 1941.  M. J. ANDERSON  2,242,409
SPEED COMPENSATING CONVEYER
Filed Jan. 8, 1940   6 Sheets-Sheet 3
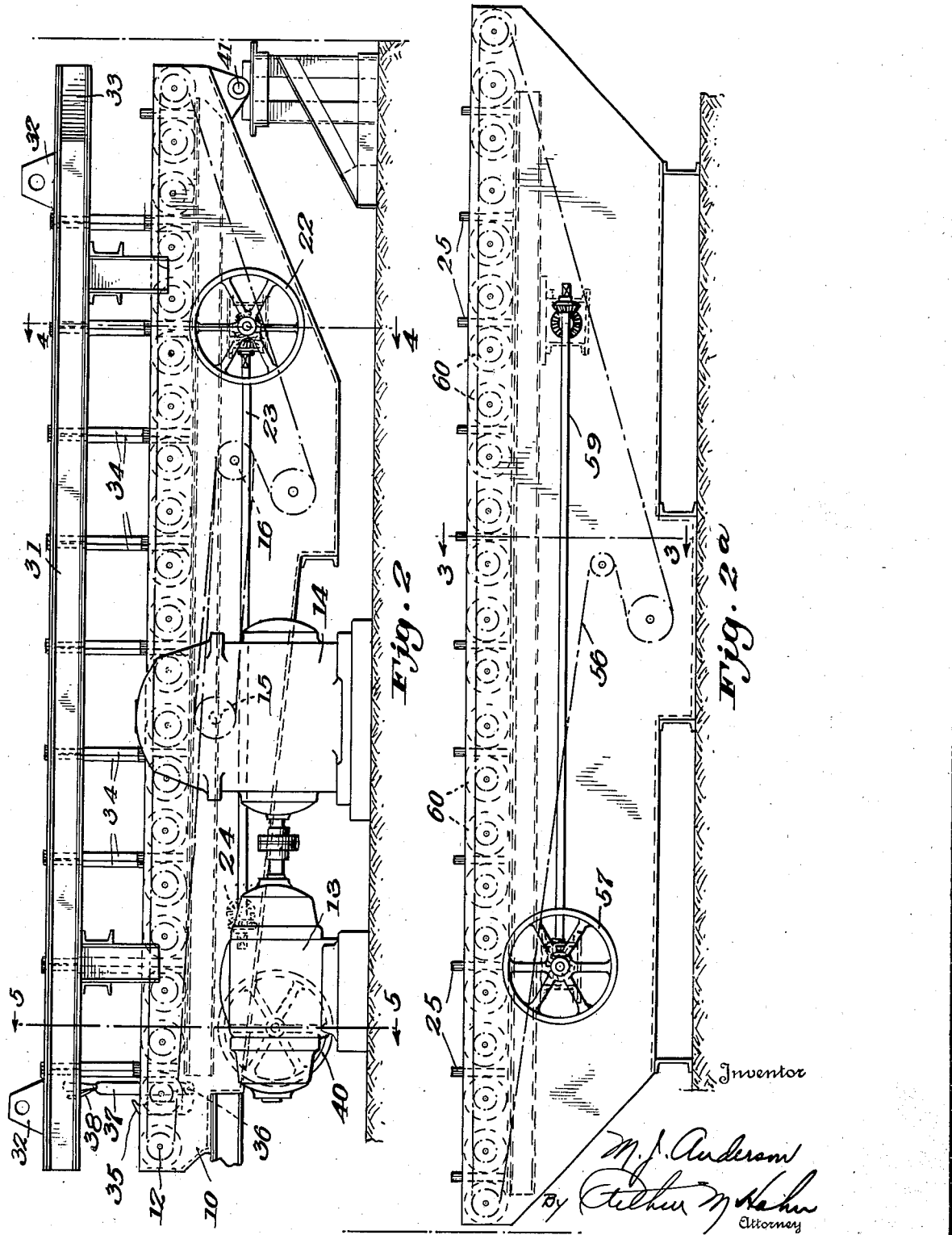

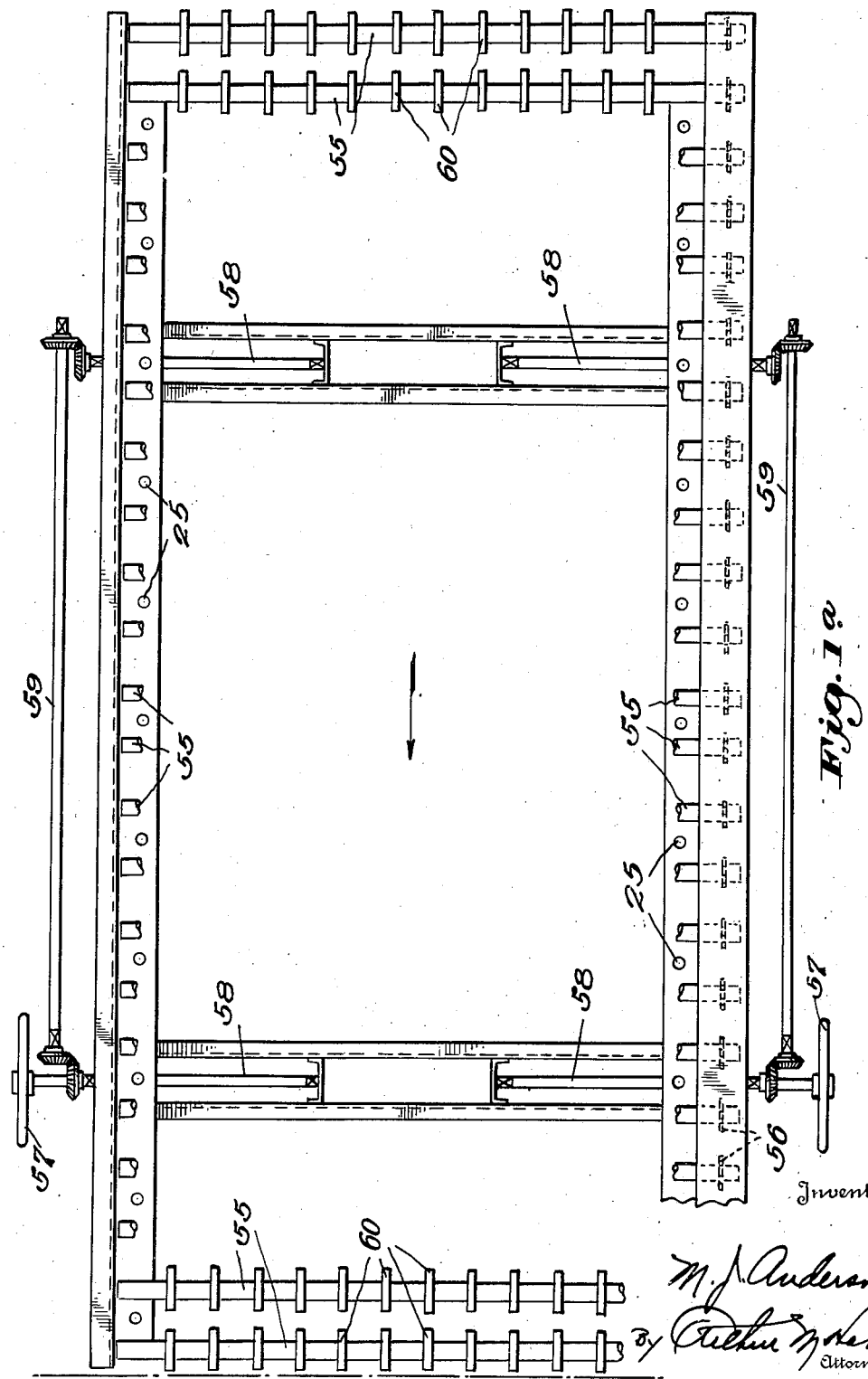

May 20, 1941.  M. J. ANDERSON  2,242,409
SPEED COMPENSATING CONVEYER
Filed Jan. 8, 1940   6 Sheets-Sheet 4
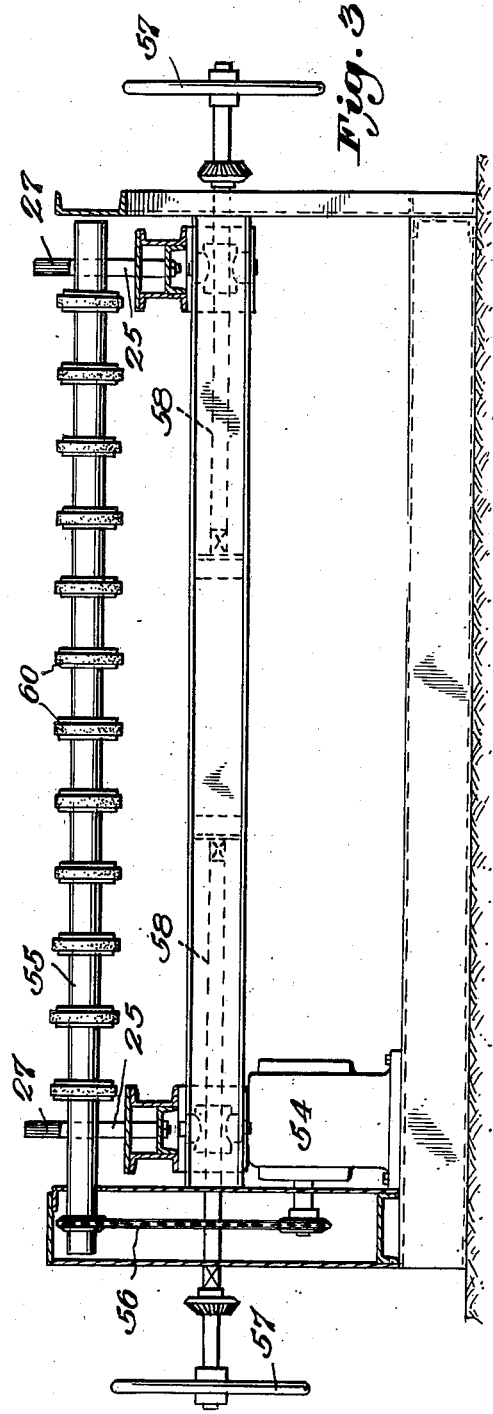
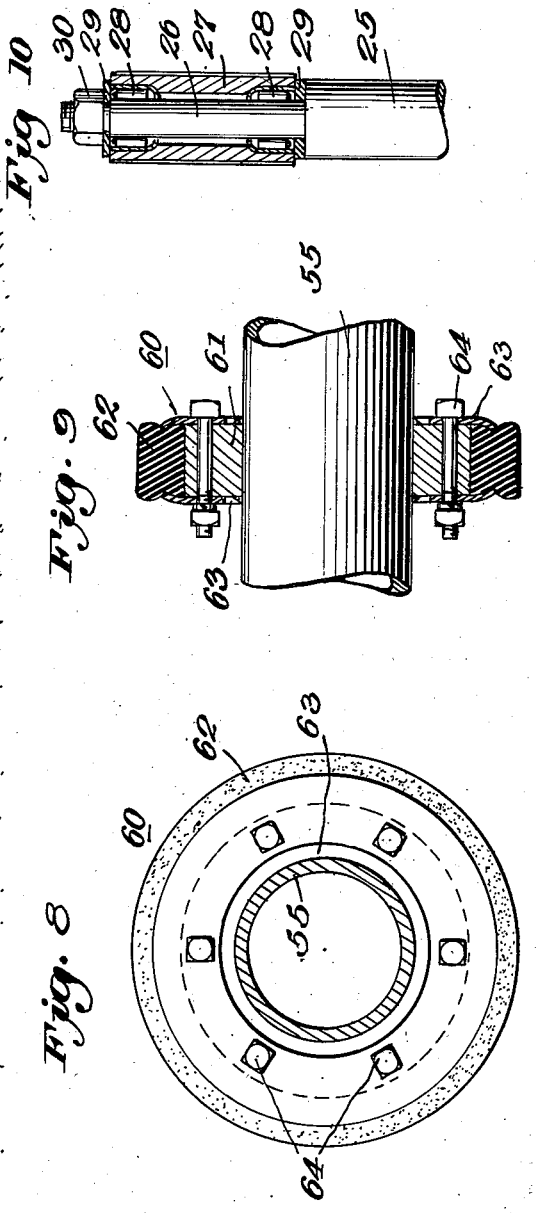
Inventor
M. J. Anderson
By Arthur M. Hahn
Attorney May 20, 1941.  M. J. ANDERSON  2,242,409
SPEED COMPENSATING CONVEYER
Filed Jan. 8, 1940  6 Sheets-Sheet 5
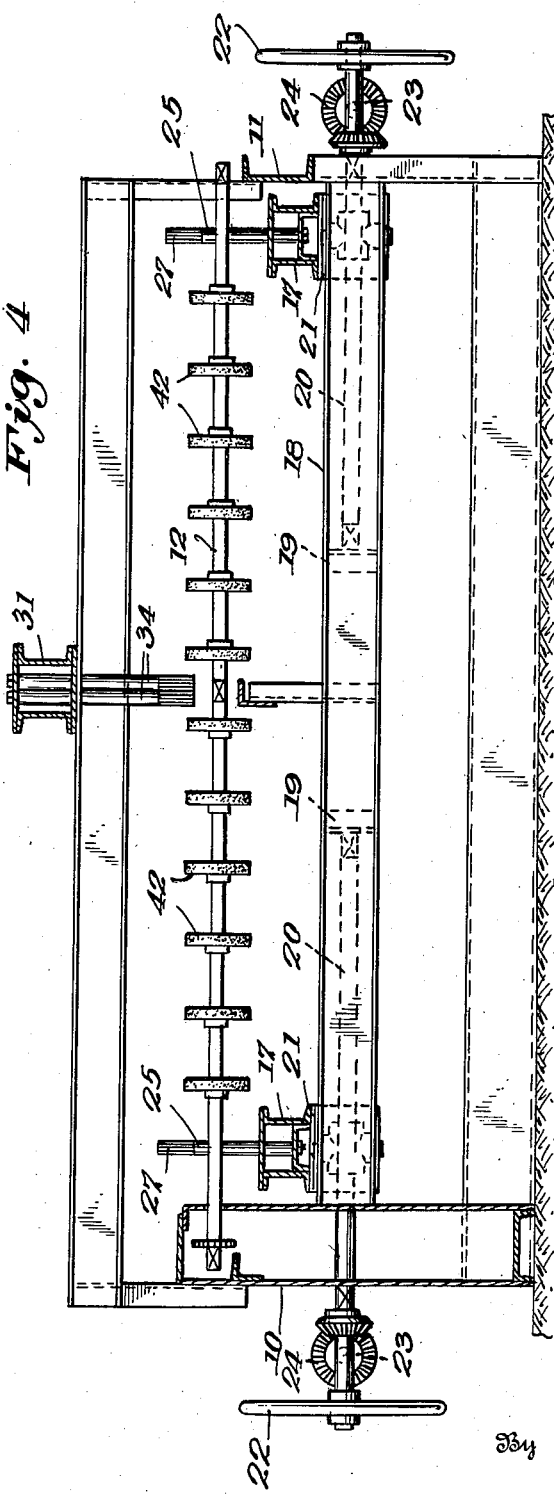
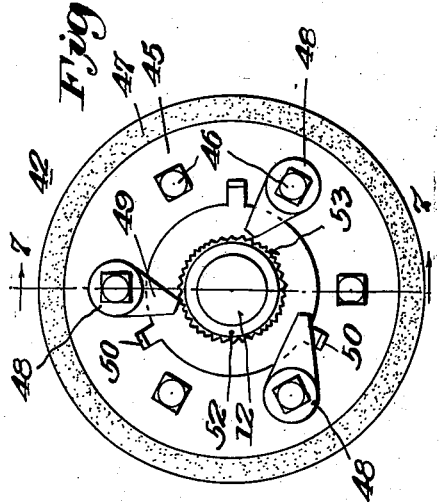
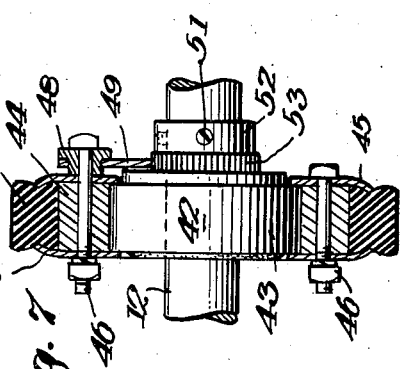

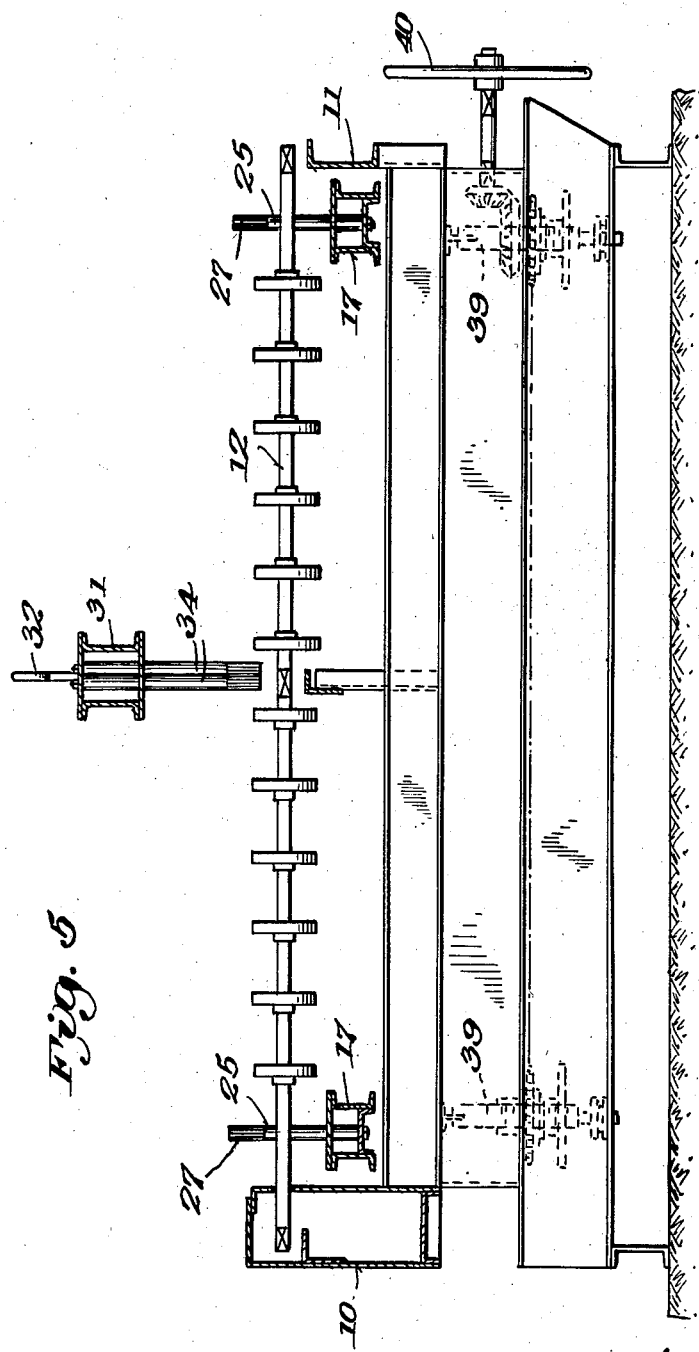

Patented May 20, 1941

2,242,409

UNITED STATES PATENT OFFICE 2,242,409

SPEED COMPENSATING CONVEYER

Martin J. Anderson, Ellwood City, Pa., assignor to Mathews Conveyer Company, Ellwood City, Pa., a corporation of Pennsylvania Application January 8, 1940, Serial No. 312,991

3 Claims. (Cl. 198—76)

This invention relates to a speed compensating conveyer which, although it is not limited in use, is particularly adapted for feeding sheets of light gauge metal in close succession to a grinder, from a higher speed loading conveyer on which they are more widely spaced, but so constructed that as the sheets are received on the slower conveyer they rest upon live discs which may overrun their drive under the impetus of the advancing sheet, to obviate slippage and consequent scratching of its surface; all as will be described more fully hereinafter, and as claimed.

In feeding a grinder for operation on metal sheets, the sheets are placed on a conveyer and are moved along it to a position entering the grinder. However, as each sheet is placed on the conveyer it moves an appreciable distance before the next succeeding sheet is in place, and the consequent intermittent delivery to the grinder causes delays in operation.

The sheets entering the grinder should be closely spaced so that there will be a minimum of interruption to the grinding operation. It is therefore proposed to utilize a loading conveyer from which the widely spaced sheets are transferred to a slower moving grinder feed conveyer, and the spaces between them thus reduced. This in itself is desirable, but as the sheet moves onto the live discs of the slower conveyer its greater speed is likely to cause it to slip thereover and scratch its surface.

In order to obviate damage to the sheet when it is so transferred, yet to retain the advantages of closing up the spaces between successive sheets in their travel to the grinder, the present invention contemplates the use of discs rather than rollers as the conveying means, and further, a conveyer disc of such construction that when the faster moving sheet passes onto it, it will overrun its drive and, because of the less inertia which it offers due to the relatively small mass of each disc, will quickly pick up speed and will not scratch the sheet passing over it.

A live disc conveyer offers advantages over the type employing rollers, in handling sheets of metal, not only because of the greater weight and inertia of rollers, but also because, since the sheet is not perfectly flat and does not rest upon the series of discs at all points, only those which are in contact with it are overdriven, whereas if rollers are used each one which contacts the sheet at any point must overrun its drive and be capable of quickly reaching a speed of rotation equalling that at which the sheet is travelling as it is received upon the conveyer.

It is accordingly an object which is achieved by this invention to provide a conveyer for sheet materials which has a plurality of driven speed compensating discs by means of which the sheet is fed, but which are adapted to overrun their drive when they receive a sheet travelling at a speed higher than their normal rotation, in order to obviate scratching and marring of the surface in contact therewith.

A further object is to provide a speed compensating disc for conveyers, which is adapted to overrun its drive when an article is transferred to it at higher than its normal driven speed, such discs offering less inertia and frictional resistance to accelerated rotation and overdrive than rollers which would afford similar support.

A still further object of the invention is to provide a speed compensating conveyer with driven discs for advancing successive sheets of material in process as they are received from a loading conveyer operated at higher speed, the discs of the former being constructed to permit them to overrun their drive and readily to assume the velocity of the sheets fed thereto, whereby the spacing of successive sheets is reduced between the points of loading and delivery, without being scraped and marred by their transfer from the higher to the lower speed conveyer.

Other and further objects will be apparent from the following description and drawings, in which Figure 1 is a fragmentary plan view of a grinder feed table with speed compensating conveyer discs for feeding materials in the direction of the arrow.

Figure 2 is a side view of the feed table of Figure 1.

Figure 2a is a side view of the loader table of Figure 1a.

Figure 3 is a vertical sectional view through the loader table, taken along the line 3—3 of Figure 2a.

Figure 4 is a vertical sectional view taken through the feed table along the line 4—4 of Figure 2.

Figure 5 is another vertical sectional view taken through the feed table, along the line 5—5 of Figure 2.

Figure 6 is a side view of one of the speed compensating discs.

Figure 7 is a sectional view through one of the speed compensating discs, along the line 7—7 of Figure 6.

Figure 8 is a side view of one of the discs or wheels of the loader table.

Figure 9 is a sectional view through such disc of the loader table.

Figure 10 is a view, partly in vertical section, of one of the guide rollers mounted on its pintle, such guide rollers being positioned so that they will guide the sheets of material by contacting their edges.

Figure 1:
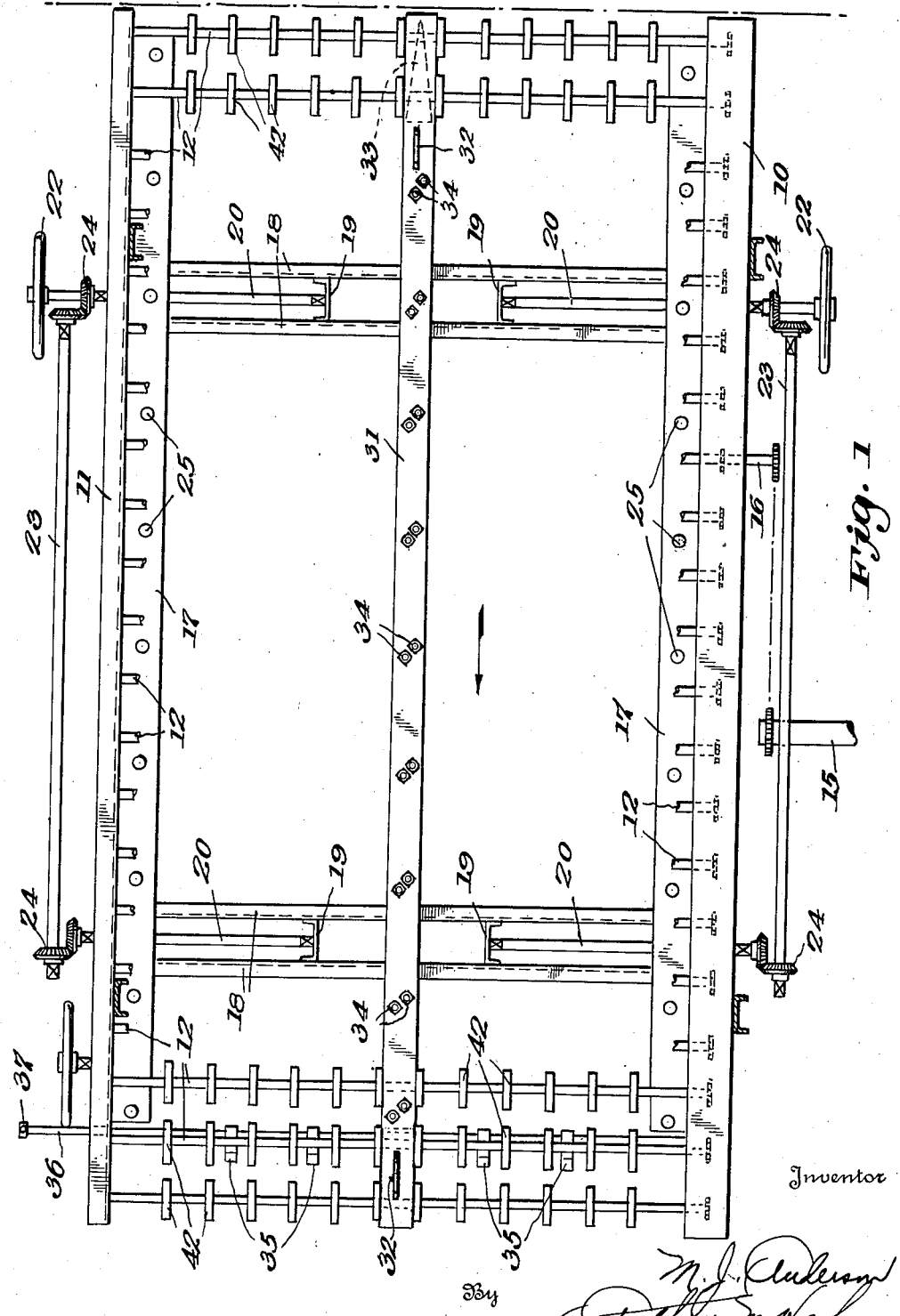
Figure 1a is a fragmentary plan view of a loading table from which the conveyed material passes in the direction of the arrow, to the feed table of Figure 1.

Referring more particularly to the drawings, and first of Figure 1, the feed table has longitudinally extending side frame members 10 and 11 and a plurality of transverse shafts 12 extending therebetween.

A motor 13, acting through reduction gearing in the housing 14, drives shaft 15 and its connected stub shaft 16, the latter being connected by an endless sprocket chain to the respective sprockets on the ends of the transverse shafts 12. Thus, the motor 13 drives all of the shafts 12 in unison.

Along each side of the frame there is an adjustable guide 17 which rests on two pairs of spaced channel members 18. Between each such pair of channel members there are vertical webs 19 in which the ends of feed screws 20 are journalled, there being two such feed screws at spaced points along each side of the frame. These feed screws serve to advance carriages 21 (Figure 4) and the respective guides which are fastened to them. A hand wheel 22 actuates one of the feed screws on each side of the table, and its companion feed screw is correspondingly rotated through connecting shaft 23 and bevel gearing 24. By such means the guides along each side of the table may be separately adjusted toward or away from each other to accommodate a sheet between them and thereby to guide it in its travel along the conveyer. The sheets are confined by vertical pins 25 which have reduced upper ends 26 mounting rollers 27 upon anti-friction bearings 28, as shown in Figure 10. The assembly is retained by upper and lower washers 29 and a nut 30 threaded on the reduced end of the pin. The rollers therefore can be brought to bear against the edges of the sheet to guide it along the table.

When narrower sheets are being fed to the grinder they may be conveyed side-by-side, separated by a center guide 31 which is lowered to position overlying the table by a hoist or other means engaging the eyes 32. The leading end of such center guide is of wedge shape as at 33 (Figure 1), and the guide mounts two series of vertical pins 34 with rollers similar to those above described, for separately contacting and guiding the respective sheets as they move together along the table in the channels defined by the center guide.

As the pairs of sheets or strips reach the delivery end of the feed table their ends can conveniently be lined-up before they are fed to the pinch and grinder rolls, by detents 35 mounted on a rock shaft 36 which is manipulated by a hand lever 37. Conventional latching means, such as a projected bolt operated by the pivoted portion of the handle 38, may be used to hold the hand lever in position, either with the detents in the path of the sheets, or retracted.

As shown in Figure 5, the delivery end of the speed compensating conveyer may be adjusted vertically by screw jacks 39 operated by hand wheel 40, to raise or lower that end with respect to the receiving end which is mounted on a pivotal support 41 (Figure 2).

The feed wheels or discs 42 of the speed compensating conveyer may be mounted on their respective driving shafts 12, either in alignment as shown in the drawings, or staggered. Each disc, as shown in Figures 6 and 7, comprises an inner, anti-friction bearing assembly 43 and an outer annulus 44 secured to the outer race ring of the bearing by side rings 45 which are retained by bolts 46 and which additionally retain a rubber, wood, or composition tire 47. Certain of the bolts 46 project beyond one face of the disc and mount shouldered sleeves 48 upon which pawls 49 are journalled to swing by gravity. The face of the side ring 45 adjacent the pawls is struck out at intervals forming lugs 50 which serve as stops for the pawls in their retracted position.

The inner race ring of the bearing 43 may be extended as a hub fixed to the shaft 12 by a set screw 51, or it may have a driven fit on the shaft, and the hub 52 may be in the form of a separate collar similarly secured to the shaft. The projecting portion of the hub is knurled as at 53 so that in one direction of rotation of the disc the pawls will engage the hub and will drive the annulus when the shaft is rotated in a clockwise direction as seen in Figure 6. Thus, rotation of the discs will feed a sheet along the conveyer, but if the sheet is received at a speed higher than that at which the discs are driven through shaft 12 it will drive the discs at higher speed, the pawls then riding freely over the knurled hub.

The sheets are transferred to the speed compensating conveyer just described from a loading conveyer such as is shown in Figures 1a, 2a, and 3.

Referring first to Figure 3, a motor 54 drives shafts 55 through sprocket gearing 56. The loading table is provided with adjustable side guards similar to those previously described for the speed compensating conveyer, in order that sheets placed on the conveyer may be properly guided and delivered therefrom. Adjustment of these side guards is effected by means of hand wheels 57 and feed screws 58, with connecting shafts 59 at each side of the table for rotating each pair of screws in unison.

A plurality of discs 60 are mounted on each of the shafts 55, each such disc comprising a hub 61 secured on the shaft and a rubber, wood, or composition rim 62 retained by side rings 63 which are secured to the hub by bolts 64.

In operation, the guards at the sides of the respective loading and speed compensating conveyers are adjusted to receive sheets of a determined width, after which the metal sheets are placed on the loading conveyer and carried forward for transfer to the speed compensating conveyer which is driven at a slower speed. The initial spacing of the sheets is reduced by transferring them from the faster to the slower conveyer, and as a sheet passes onto the latter its speed is in excess of the normal rate of feed to the grinder. Consequently, as it comes in contact with the discs of the slower conveyer it rotates them faster than the rate at which they are driven, but because they are freely rotatable in the direction of drive the sheet does not slip over them and is not injured by being scratched. Further, since the sheet may not be perfectly flat, and therefore may not contact all of the discs on any one shaft, only those with which it is in contact will be overdriven. These, because of their inconsiderable mass, will be brought quickly to the speed of the sheet passing over them, and when the sheet loses speed the remaining discs will continue to advance it by their drive through the shafts.

From the foregoing it will be apparent that this invention provides mechanism for the economical handling of materials, to avoid time losses caused by intermittent operation upon the materials, and to obviate damage to them in being transferred from one conveyer to another of slower speed.

What I claim as my invention is:

1. A speed compensating conveyer system for conveying sheet material comprising two power driven conveyers operating at different speeds and arranged so that the faster driven conveyer will deliver the sheet material to the slower driven conveyer, said slower driven conveyer having a plurality of longitudinally spaced and transversely arranged drive shafts, each provided with a plurality of independently overrunning discs, said discs each having a relatively narrow surface for engaging the sheet material and a relatively small mass whereby each disc contacted by the sheet material will quickly accelerate to the speed of the material and reduce to a minimum the relative movement between the material and surface of the disc, thereby to avoid scratching and marring of the sheet material.

2. A speed compensating conveyer system for conveying sheet material comprising two power driven conveyers operating at different speeds and arranged so that the faster driven conveyer will deliver the sheet material to the slower driven conveyer, each of said conveyers having a plurality of longitudinally spaced and transversely arranged drive shafts, each of said drive shafts having a plurality of laterally spaced discs thereon adapted to engage and support the sheet material, the discs of said slower running conveyer each including an overrunning clutch whereby the disc will be positively driven in one direction by the shaft on which it is mounted but is free to rotate faster than said shaft in the same direction, each of said last mentioned discs having a relatively narrow surface for engaging the sheet material and a relatively small mass whereby each disc contacted by the sheet material will quickly accelerate to the speed of the material and reduce to a minimum the relative movement between the material and surface of the disc, thereby to avoid scratching and marring of the sheet material.

3. In a speed compensating conveyer for conveying sheet material, a plurality of longitudinally spaced and transversely arranged shafts, means for driving said shafts, each of said drive shafts having a plurality of laterally spaced discs thereon adapted to engage and support the sheet material, said discs each being provided with an overrunning clutch whereby the disc will be positively driven in one direction by the shaft on which it is mounted but is free to rotate faster than said shaft in the same direction, each of said discs having a relatively small mass and a relatively narrow peripheral surface in the form of a tire of nonabrasive material whereby each disc contacted by the sheet material will quickly accelerate to the speed of the material and reduce to a minimum the relative movement between the material and surface of the disc, thereby to avoid scratching and marring of the sheet material.

MARTIN J. ANDERSON.